United States Patent [19]

Smith et al.

[11] Patent Number: 5,440,917
[45] Date of Patent: Aug. 15, 1995

[54] LEAK DETECTOR

[75] Inventors: Glenn T. Smith, 2637 Chassella Wy, Rancho Cordova, Calif. 95670; Don T. Smith, Rancho Murieta, Calif.

[73] Assignee: Glenn Smith, Rancho Cordova, Calif.

[21] Appl. No.: 234,369

[22] Filed: Apr. 28, 1994

[51] Int. Cl.⁶ .................... G08B 21/00; G01M 3/16
[52] U.S. Cl. ........................ 73/40; 340/605; 73/49.2
[58] Field of Search ............ 73/40, 49.2, 40.5, 49.5; 340/592, 605, 620

[56] References Cited

U.S. PATENT DOCUMENTS

| | | | |
|---|---|---|---|
| 3,485,085 | 12/1969 | Hawkins, Jr. | 73/40.5 R |
| 4,126,857 | 11/1978 | Lancia et al. | 340/620 |
| 4,332,170 | 6/1982 | Belval et al. | 73/40.5 R |
| 4,631,952 | 12/1986 | Donaghey | 73/23 |
| 5,058,421 | 10/1991 | Alexander et al. | 73/49.2 |
| 5,101,657 | 4/1992 | Lahlouh et al. | 73/40.5 R |
| 5,315,291 | 5/1994 | Furr | 340/605 |
| 5,341,128 | 8/1994 | Keyser et al. | 73/40 |
| 5,357,241 | 10/1994 | Welch, Jr. et al. | 340/605 |

FOREIGN PATENT DOCUMENTS

| | | | |
|---|---|---|---|
| 0216426 | 8/1990 | Japan | 73/40 |
| 2218836 | 11/1989 | United Kingdom | 73/40 |

*Primary Examiner*—Robert Raevis
*Assistant Examiner*—J. David Wiggins

[57] ABSTRACT

A leak detector apparatus, comprising as an integral part of its construction, an absorbant ring with a conductive strip running around its entire inner surface. The absorbant ring is placed inside a "U" shaped nonconductive ring that has a conductive strip running around the entire inner surface of the inside wall. The leak detector apparatus also comprises a low voltage power supply, a low voltage light, a test switch, a wall plate, and some insulated wire. The assembled rings act as a sensor when placed on the floor, open side down, around the outside of the sewage line flange. Water leaking from where the commode sewage line connects thereby flows towards or collects on parts of the leak detector apparatus, which activates the leak detector, turning on the light and alerting the property owner of the leak by means of the light alarm, thus allowing the owner an opportunity for repairs to be made before water damage occurs.

4 Claims, 1 Drawing Sheet

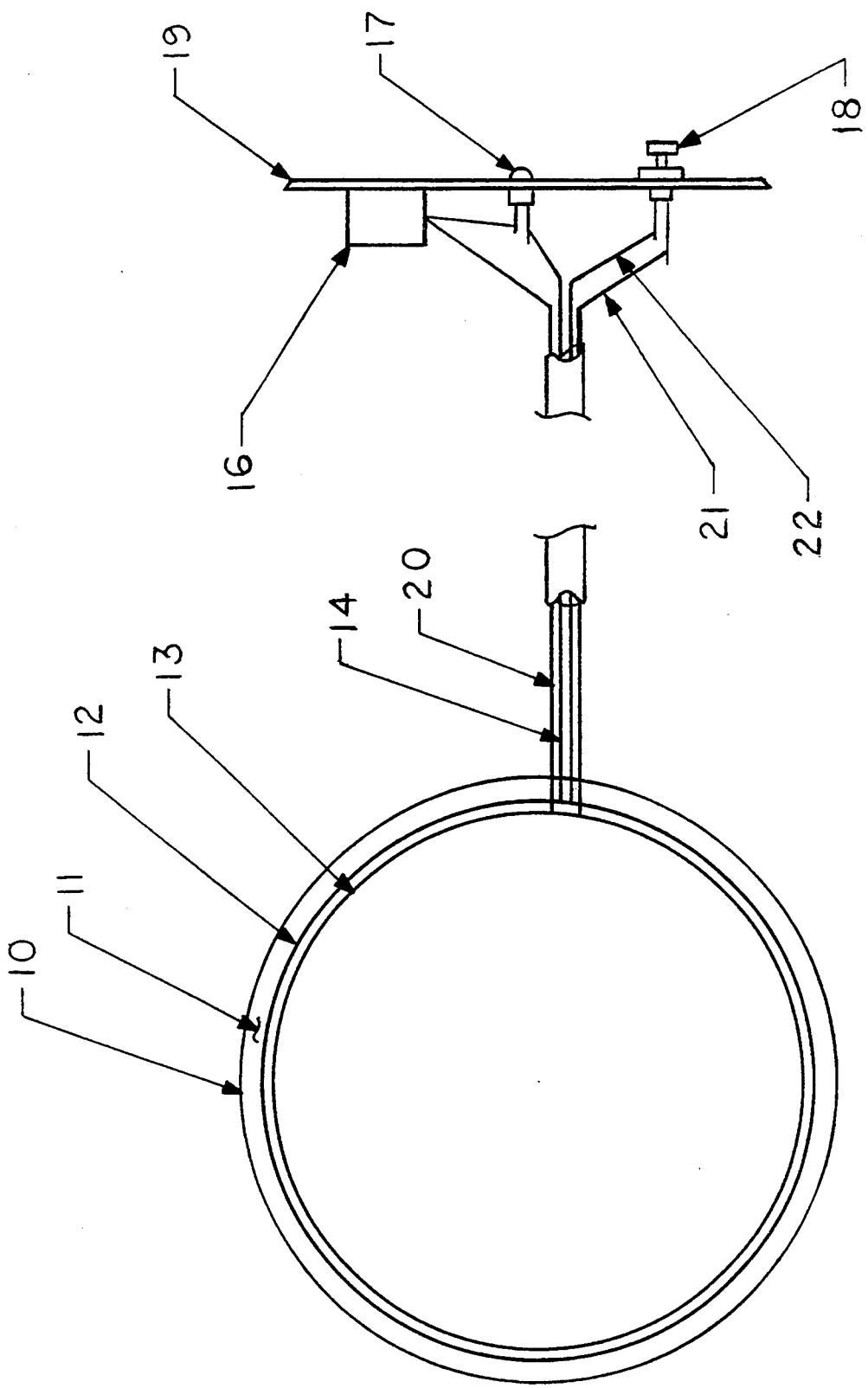

5,440,917

LEAK DETECTOR

A leak detector, comprising as an integral part of its construction a non-conductive "U" shaped ring with a conductive strip secured to the entire inner surface of its inside wall. The leak detector apparatus also comprises a fluid-absorbant ring with a conductive strip secured to its entire inner wall, a low voltage D/C power supply (hereon referred to as power supply), a low voltage light, a push button switch N/O, a wall outlet plate, four M/F wire connectors, and some insulated wire. The absorbant ring is of a diameter and thickness that will allow it to be installed and secured inside the "U" shaped ring so that it is flush with the open side of the "U"-shaped ring and the conductive strips are facing but not touching. Four insulated wires are attached, two to each conductive strip and a connector to each wire. The low voltage light is connected in series with one conductive strip wire and one side of the power supply; the other conductive strip wire is connected to the other side of the power supply. The push button switch is connected to the two remaining wires. The power supply, switch, and light are all mounted to the outlet plate. After the leak detector has been installed, the push button switch is used to make sure power is reaching the conductive strips. A leak occurring due to a faulty gasket, for example, causes the absorbant ring to swell and press the two conductive strips together, completing the circuit between light and power supply. The light comes on, alerting the property owner to the problem.

BACKGROUND OF THE INVENTION

1. Field of the Invention

The invention falls within the field of leak detectors. More specifically, it relates to detecting hidden leaks when they occur, such as when the gasket between the commode and sewage line cracks or breaks, and begins leaking.

2. Description of Prior Art

Previous leak detectors have been in the form of dyes that bleed when leaks occur, or channels that catch the leak and carry it away. The invention/product seems to be unique in regards to where it works and how it works.

SUMMARY OF THE INVENTION

The instant invention was conceived because of the fact that all gaskets used to date to seal the connection of commode to sewage line will eventually leak, many times going undetected until much damage has been done due to dry rot, mold, mildew, and/or rust. The instant invention is not designed to stop leaks, but to detect them once they occur. This function is achieved by placing the leak detector on the floor around the sewage line, open side down, plugging the four sets of wires together, installing the commode and wall plate, and then checking for proper installation by using the push button switch. When the gasket fails, water is absorbed by the absorbant ring, which swells and presses the two conductive strips together, completing the circuit and turning on the light alarm.

The early detection of these unseen leaks allows for early repairs which will eliminate costly repairs. This will save property owners and insurance companies a great deal of money and inconvenience caused by leaks that went undetected in the past.

A leak detector of such construction provides for:
a) economical manufacturing
b) easy installation
c) low maintenance
d) elimination of costly repairs
e) wide variety of applications (it can be manufactured in many different diameters)
f) re-use options; when set off by overfilled tub, sink, etc., the absorbant ring can be replaced
g) battery or low voltage transformer can be used as power supply options
h) smart property protection

BRIEF DESCRIPTION OF THE DRAWING

FIG. 1 is the leak detector rings in an orthographic bottom view.

FIG. 2 is the wall plate with power supply, light, and test switch.

DESCRIPTION OF THE PREFERRED EMBODIMENT

In reference to the accompanying drawing of FIG. 1 for use in discovery of leaks near a sewage line junction for example, the leak detector is comprised of a non-conductive "U" shaped ring (10) with a conductive strip (13), secured to the entire inner surface of its inside wall. An absorbant ring (11) with a conductive strip (12) secured to the entire inside wall, is secured inside the "U" shaped ring so that both conductive strips are facing each other but not touching. Four wires (14, 20, 21, 22) are attached, two to each conductive strip (12) and (13). To one wire (14), one side of the low voltage light (17) is connected, and the other side of the light is connected to the power supply (16). Wire (20) is connected to the other side of the power supply (16). The two remaining wires (21 and 22) are attached to the switch (18). The light (17), power supply (16), and switch (18) are mounted to the wall plate (19). When a leak occurs at the sewage line junction, some of the resulting moisture drips, flows, sprays or otherwise forms on parts of the leak detector apparatus and absorbed by the absorbant ring (11), causing it to expand, pressing the two conductive strips (12 and 13) together, completing the circuit between light alarm (17) and power supply (16), turning on the light alarm (17) and alerting the property owner to the problem.

It is to be noted that the leak detector apparatus can be made from many of the absorbant and non-conductive materials which are readily available to the typical retail customer, industrial supplies buyer or commercial property owner, as are the light, power supply, switch, conductive strips, and wire. It is to be further noted that the inside diameter of the invention can be changed to allow for adaptation to different applications. It is to be further noted that the absorbant ring (11) can be replaced easily and economically, allowing the leak detector apparatus to be re-used.

What is claimed is:

1. A leak detector apparatus formed into a removeable clamp, gasket, or flange type member for placement around the circumference, periphery, perimeter, or base boundary of a fluid-handling pipe, pump, vessel, or household component such as a tub, sink, or commode, comprising the following elements: a rigid U-shaped ring consisting of an outside diameter wall with an inside surface and an outside surface, an inside diameter wall with an inside surface and an outside surface (inside surface being that surface of the two parallel walls that face one another), and a bottom ring secured fully around and flush with the edge of said walls, thusly forming said U-shaped ring, with an electrically conductive strip secured fully around on the inside diameter wall, and an absorbant band made from swellable, fluid-absorbing material, non-conductive electrically with an outside diameter surface attached fully around the inside surface of said outside diameter wall of "U"-shaped ring; where said absorbant band has an inside diameter surface with an electrically conductive strip secured fully around said inside diameter surface such that said conductive strips are arranged concentrically and facing each other, but not contacting anywhere along the circumference due to an air gap separating the facing surfaces of the two internal conductor strips within said U-shaped ring; a wire lead from the positive terminal of a low voltage power supply is connected to one side of a low voltage warning lamp, with another wire lead from the other side of said warning lamp connected to the conductive strip on the absorbant band, while another wire lead from the negative terminal of said power supply is connected to the other conductive strip on the U-shaped ring, such that the said air gap serves to separate the two said conductive strips with a uniform circumference spacing and maintain an open electrical circuit while the leak detector apparatus is maintained under dry conditions (no leak-status), so as to provide voltage for a visible alarm in case a leak develops and exposes said apparatus to wet conditions (leak status) that alter the prior separation spacing and circular geometry between the two said conductive strips for a closed circuit situation; and a test switch is included with two wire leads therefrom connected across the two said conductive strips, thereby illuminating said warning lamp during a status check test of said leak detector apparatus, performed at will by owner/operator; said test switch, said warning lamp, and said power supply are each mounted on a local remote wall plate, as placed at an observer accessible location on wall, with appropriate gauge wire used throughout for all electrical interconnections.

2. A method using the leak detector apparatus of claim 1, wherein said U-shaped ring is placed around liquid-handling/conveying components at areas where leaks might occur; when a leak develops in the vicinity of said apparatus, said absorbant band swells in the presence of such leaking fluid, thereby pressing the two said conductive strips together into direct contact at one or more segments along their circumference spacing, which closes and completes the electrical circuit formed by the two said conductive strips with said power supply and said warning lamp, thus turning on the said warning lamp as mounted on said wall plate, and promptly alerting the property owner to the early problem of escaping fluid at said component.

3. A leak detector apparatus as in claim 2 wherein said absorbent ring is replaceable, making the leak detector re-usable.

4. A leak detector apparatus as in claim 3 wherein said low voltage power supply can be a battery or a transformer.

* * * * *